Nov. 20, 1951 S. W. BRIGGS ET AL 2,575,995
BY-PASS FILTER
Filed June 10, 1946 2 SHEETS—SHEET 1

Inventor
SOUTHWICK W. BRIGGS & W. J. EWBANK
By Semmes, Keegin, Beale and Semmes
Attorneys Nov. 20, 1951 S. W. BRIGGS ET AL 2,575,995
BY-PASS FILTER
Filed June 10, 1946 2 SHEETS—SHEET 2
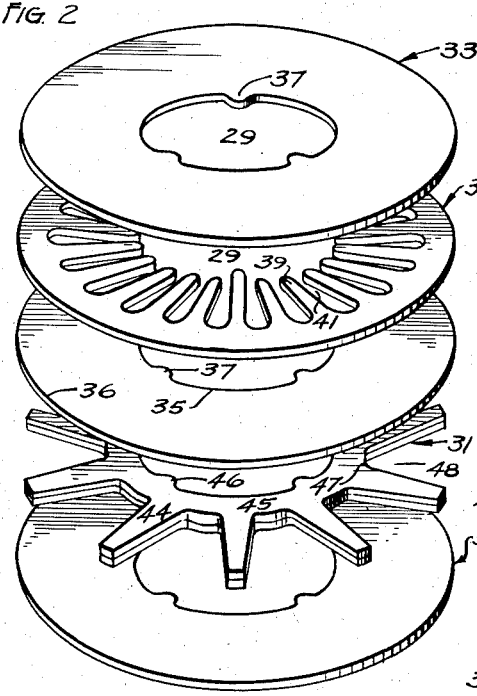
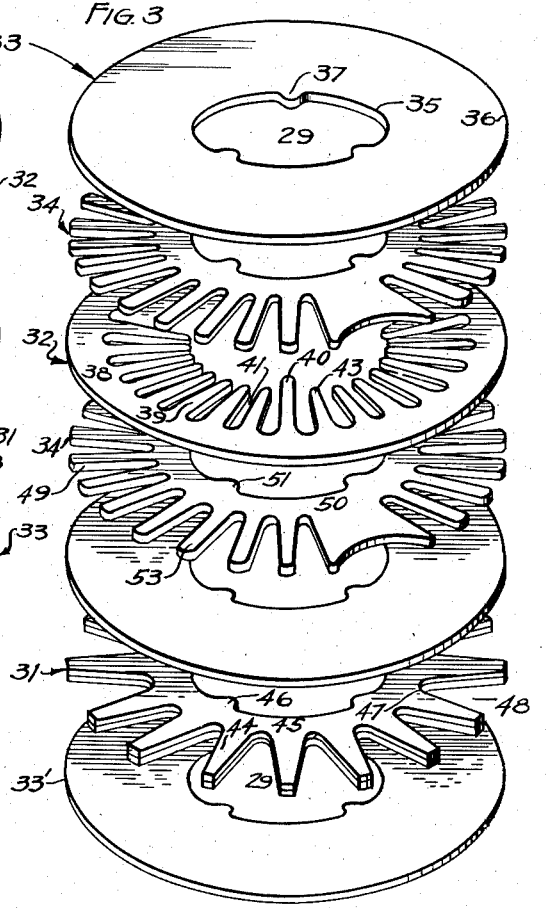
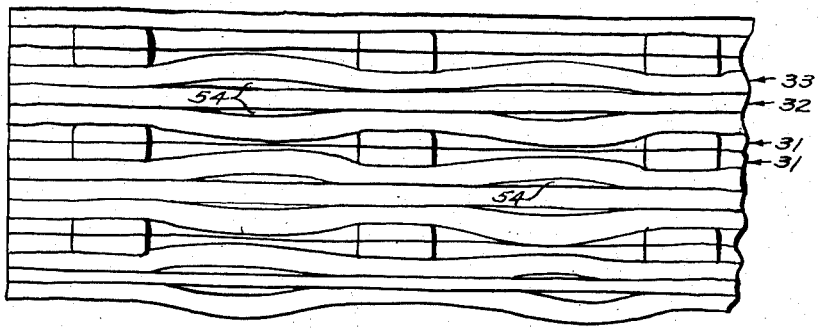
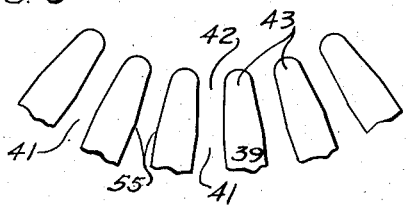
Inventor
SOUTHWICK W. BRIGGS
WALTER J. EWBANK
By Semmes, Keegin, Beale and Semmes
Attorneys Patented Nov. 20, 1951

2,575,995

UNITED STATES PATENT OFFICE 2,575,995

BY-PASS FILTER

Southwick W. Briggs, Washington, D. C., and Walter J. Ewbank, Bethesda, Md.; said Ewbank assignor to The Briggs Filtration Company, Bethesda, Md., a corporation of Maryland Application June 10, 1946, Serial No. 675,646

7 Claims. (Cl. 210—183)

This invention relates to the art of filtration and more particularly to a filter cartridge formed by a series of stacked discs.

In general, the rate at which a fluid may pass through a filter is dependent upon the surface area of the filtering medium that is exposed to the fluid. It has long been desired to provide a filter of as high a flow capacity as possible within a relatively small casing. Naturally one of the first methods tried was to increase the exposed area of the filtering medium.

Filter cartridges formed from a series of discs stacked to form a unitary structure were one of the results of the investigations toward increasing the capacity of a filtering unit when the space available is limited. With the use of this type of filter it is possible to provide a filter in which the exposed area of the filtering medium greatly exceeds the external surface of the filter cartridge. In general, disc type filters consist of a cartridge of the type described above mounted in a casing which has connections for the introduction of the dirty fluid and removal of the filtered fluid. In most instances the fluid flows generally from the outside of the cartridge through openings into the filter mass where it changes direction to flow through a disc of the filter material and then flows unrestrictedly to the filter outlet.

In many applications of filters it is not necessary that all of the fluid pass through a filtering medium each time it passes through the apparatus in which it is used. A mechanism which will permit part of the fluid to by-pass the filtering material will allow the filter to handle a large throughput of fluid without excessive size or cost of the filter installation. Ordinarily it will be desirable to strain all of the fluid passing through such a filter to insure the removal from the fluid of any large, solid particles which might injure the mechanism in a single passage therethrough.

It is an object of this invention to provide a filter cartridge of the disc type in which a portion of the fluid may pass therethrough without passing through the filtering material.

Another object of this invention is to provide a disc type filter cartridge capable of handling a high rate of flow of fluid.

It is also an object of this invention to provide a disc type filter cartridge which will strain solids greater than a fixed maximum size from the fluid which by-passes the filtering material.

Still another object of this invention is to provide a filter cartridge of low cost capable of being readily replaced in the filter.

With these and other objects, which will become apparent throughout the following detailed description of the apparatus, in mind, this invention resides in a disc type filter which provides channels for the unfiltered fluid to flow to the filter outlet without passing through the filter material. That part of the fluid by-passing the filtering material is forced through channels of a restricted nature which strains solid particles exceeding a fixed maximum size from the fluid.

In the drawings:

Figure 2 is an exploded perspective view illustrating the manner of stacking the various discs in one of the modifications of this invention.

Figure 3 is also an exploded perspective view illustrating the manner of stacking the various discs in the preferred form of the invention.

Figure 4 is an elevational view of the same modification of the invention illustrated in an exploded view in Figure 2, depicting in an exaggerated manner, the mode of operation of the by-pass in this form.

Figure 5 is an enlarged plan view of a part of one of the discs.

Figure 1:
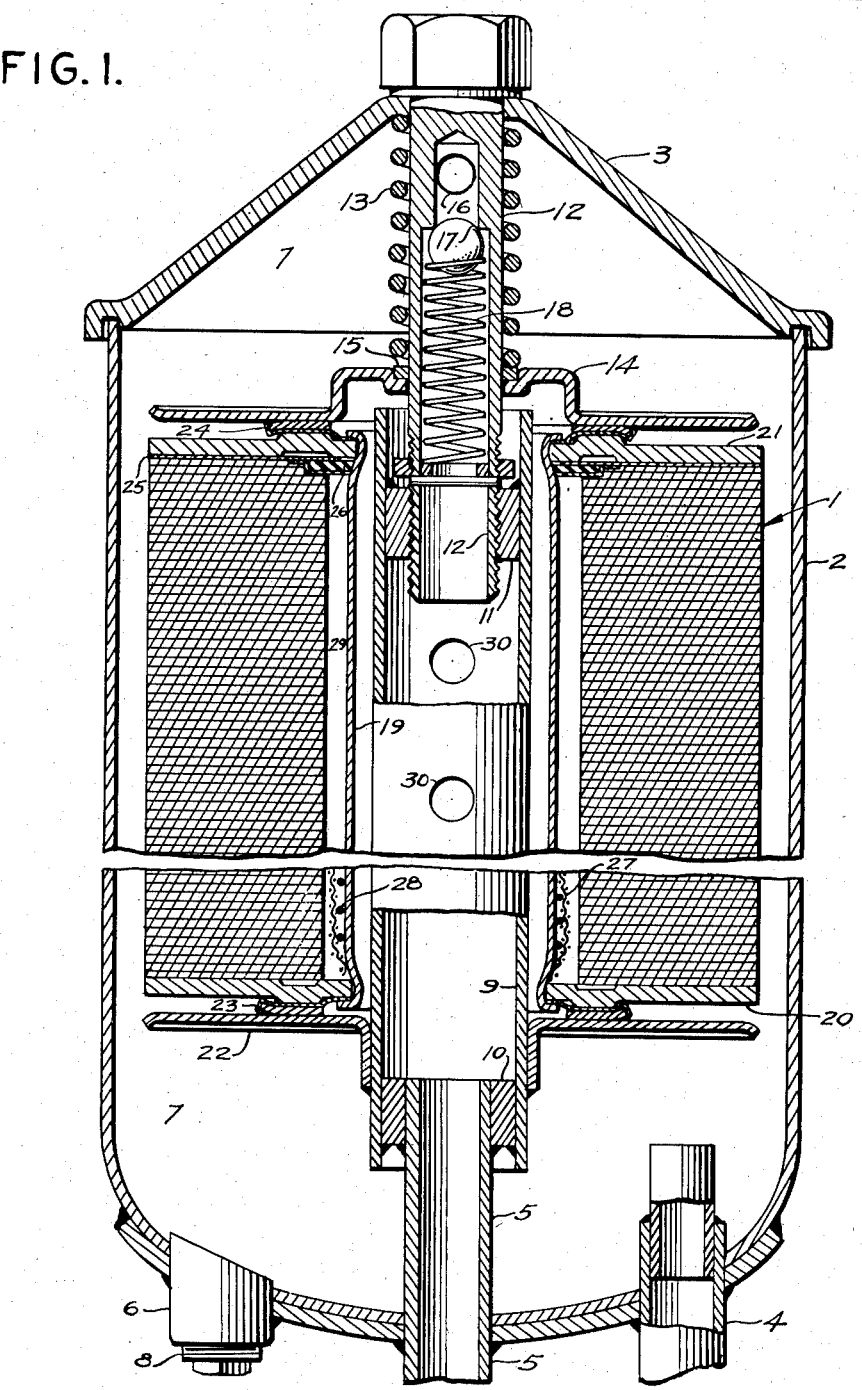
Figure 1 is a vertical longitudinal section of a filter showing the structure used to support the cartridge within the filter casing.

The filter cartridge of this invention may be installed in any conventional filter casing. In the structure shown in Figure 1 the cartridge, indicated generally as 1, is supported in a filter casing 2 having a cover plate 3 tightly attached to its upper end. An inlet 4 is provided for the introduction of the dirty fluid into the lower part of casing and an outlet 5 is provided, also at the bottom of the filter casing, for the removal of the filtered fluid. A nipple 6 extends into the lower part of the casing chamber, indicated generally as 7, to allow the removal of any sludge which may collect therein. Threaded plug 8 screws into the outwardly extending portion of nipple 6 to close it during operation of the filter.

Securely mounted concentrically about the upper end of outlet 5 is an enlarged discharge tube 9 extending centrally through most of the length of the filter casing. A sleeve 10 fits tightly about outlet 5 and tightly within the lower end of tube 9 and is welded to both parts to prevent leakage between the two members. Sleeve 11, similar to sleeve 10 except that it is internally threaded, fits tightly within tube 9 at its upper end and also is welded.

A hollow screw 12 extends downwardly from the center of cover 3 and is screwed into internally threaded sleeve 11. A helical spring 13 surrounds hollow screw 12 and by acting against the casing cover 3 constantly urges an end plate 14 in a downward direction. End plate 14 fits closely and slidably around the outer surface of hollow screw 12. Leakage of dirty fluid between the hollow screw 12 and end plate 14 is prevented by a ring of packing or gasket material 15 located in a recess on the upper surface of plate 14 and directly below spring 13.

An opening 16 is provided in hollow screw 12 to allow the escape of dirty fluid from the casing chamber 7 to the discharge tube 9 when the filter becomes plugged. A pressure release valve which is illustrated by a sphere 17 mounted on a spring 18 in the inner area of screw 12 allows the passage of dirty fluid into the filter outlet when excessive pressure is obtained in the casing chamber. Of course, the release pressure required to move sphere 17 and allow discharge of dirty fluid to the filter outlet may be varied by insertion of a different spring at 18.

The filter cartridge, indicated generally as 1, is mounted about a perforated central tube 19 (perforations not shown) to the end of which flanges 20 and 21 are securely attached to form a rigid spool. In the assembly of the filter, the cartridge is placed concentric with and spaced laterally from discharge tube 9. Movable plate 14, which is urged downward by spring 13 presses against the upper flange 21 of the spool. Because of the rigid nature of the spool, the lower flange 20 in turn presses against a flange-like base plate 22 welded to discharge tube 9 near its lower end. Thus, the compression of spring 13 holds the filter cartridge securely in place. Leakage of dirty or contaminated fluid between base plate 22 and end plate 20 is prevented by gasket 23. Similarly, leakage between end plate 14 and end plate 21 at the upper end of the cartridge is prevented by gasket 24. While a method of supporting the cartridge within the filter casing has been described in considerable detail, any suitable means of support may be used.

Immediately below the end plate 21 is a floating plate 25 which may be moved along central tube 19. This plate which is the subject of copending application of S. W. Briggs, Serial No. 549,242, filed August 12, 1944, now a Patent Number 2,454,033, November 16, 1948, moves downward along the central tube 19 as the filter cartridge shrinks during use. Leakage between the floating plate and central tube 19 is prevented by a ring of packing material 26 inserted in a channel along the underside of the floating plate. A screen 27 spaced from the central tube 19 by a helical member 28 may be used to prevent migration of the filter material into the effluent stream as the filter cartridge becomes weakened through use.

A central bore 29 extends through the cartridge and surrounds central tube 19. The perforations (not shown) in tube 19 and openings 30 in discharge tube 9, provide a route through which fluid discharging from the filter cartridge may pass to outlet 5. Throughout the description of the apparatus, it will be assumed that the net flow of the fluid is from the outside of the cartridge toward the center, but, of course, the flow could be in the opposite direction without any alterations in the equipment shown.

As is best shown in Figure 3 the filtering mass is comprised of a series of apertured discs stacked to form a unitary structure having a central bore 29 extending longitudinally through it. In general, the structure is formed by inlet discs 31 and drainage disc 32 in alternating relationship to each other and having filter discs 33 placed between the inlet and drainage discs. In the preferred form of the invention illustrated in Figure 3, spacer discs 34 lie between the drainage discs and the filter discs. However, a wide variation in the order of the discs is possible without departing from the spirit of this invention.

Filter discs 33 consist of an annulus of filtering material through which the major part of the oil passes to be clarified. The discs may be of any suitable shape, such as round as shown in the drawing; however, certain advantages such as more effective use of materials and aiding in aligning the discs accrue from discs of a generally square shape. The inner edge 35 of the filter discs in combination with the inner edges of the other discs form a central bore extending through the filter cartridge. Likewise, the outer edge 36 of the filter discs combines with the outer edge of the other discs to form the external surface of the filter cartridge. It is often desirable, especially when the discs are round, to have tabs 37 protruding from the inner edge of the filter discs to aid in the proper alignment of the discs as they are stacked.

Since disc 33 is designed for clarifying the fluid passing through it, it should be of a filtering material having the desired characteristics. For example, if it is desired that high rates of flow through the discs be obtained the materials should be relatively porous. On the other hand, if it is desired that the flow through the discs be relatively slow and thorough contact between the fluid and the filtering medium be obtained, a more dense structure may be employed.

Drainage discs 32 consist of an outer annulus 38 from which fingers 39 extend inwardly. The outside diameter of the drainage discs should be the same as that of the filter discs. The fingers 39 of the drainage discs should be of such a length that their inner ends will be properly aligned with the inner edge 35 of the filter discs upon stacking. In order to facilitate the proper stacking of the discs, some of the fingers, designated by 40 should be longer than the other so that they may be aligned properly with tabs 37.

The channels 41 between fingers 39 open inwardly and communicate directly with the central bore 29. Preferably the inner ends of the fingers 39 should be tapered, as illustrated in Figure 5, in such a manner that the walls of channels 41 are parallel at 42 near the central bore. A short distance from the inner ends of fingers 39, such at 55, the walls of the channels should diverge towards the outer edge of the draining discs, thereby increasing the area of the filter disc exposed to the drainage channels. If the walls of the channels are parallel near the channel outlets, the tendency of the fingers to be displaced or the channels to be blocked is decreased when the filter mass is compressed and softened during use. The channels may be radial, as shown in Figure 5, or may intersect the central aperture at an angle to the radius of the disc passing through the point of intersection.

Drainage discs 32 may be of a filter material similar to that used in the manufacture of the filter discs. If such is the case, the drainage discs will contribute to the filtering of the fluid because of the flow of some of the fluid from the outer edge across annulus 38 to channels 41.

On the other hand, under many circumstances when serious shrinkage of filter materials is encountered, a drainage disc of relatively hard, dense material is desired to contribute to the strength of the filter cartridge. Thus, the drainage discs may be of a hard paper or board, such as chip board or even of a hard, impervious plastic material. A hard material is especially desirable when an oil containing large quantities of water is being filtered.

Inlet discs 31 allow the flow of the unfiltered fluid from the filter chamber 7 into the filtering mass; consequently, it is necessary that they have channels opening outwardly to the filter chamber 7 containing the unclarified fluid. In the preferred form illustrated, these discs consist of a number of webs 44 extending outwardly from an inner annulus 45 which surrounds the central aperture. Usually it is desirable that the inlet discs be of relative heavy construction around the inner annulus; consequently, webs 44 are tapered from the inner to the outer edge. Since the inlet discs 31 form part of the filter cartridge, webs 44 are of such a length that their ends coincide with the external surface of the filter cartridge. Tabs 46 extend from the inner edge of the annulus in a manner similar to tabs 37 on the filter discs and for the same reasons.

The number of webs 44 on inlet discs 31 will, of course, depend upon the material used in the manufacture of the inlet discs and also the filter discs. The inlet discs lie adjacent to one side of the filter discs and serve as supports for those discs. There should be sufficient webs to form a firm support for the filter discs and yet the number should not be so great as to cover unduly the surface area of the filter discs.

Inlet discs 31, like drainage discs 32, may be made either of a filter material or of a dense material. If the inlet discs are of a filter material some fluid will flow from the inner end 47 of wedge shaped openings 48 directly through the annulus 45 to the central core of the filter cartridge. If a rigid filter cartridge is required, the use of a dense material in the inlet discs will provide the necessary strength and rigidity. Often it is desirable that the inlet discs be thicker than the other discs in order to enlarge the openings communicating with the filter chamber. Such is the case in Figure 3 where the inlet discs are made up of two layers of material.

In the preferred form of this invention spacer discs 34, which are somewhat similar in design to the inlet discs, lie between the filter discs 33 and drainage discs 32. These spacer discs have a number of fingers 49 extending outwardly from an inner annulus 50. However, the spacer discs are much thinner than the inlet discs and are usually less than .020" thick. Spacer discs 34, like the inlet drainage discs, may be made from either a filtering material or some more dense material. The number of webs 49 extending from the inner annulus of the spacer discs may be varied but should be sufficient to form a support for the filter discs in the manner hereinafter described. Because the spacer discs are thin, ordinarily fewer webs will be necessary in them than in the inlet discs.

Referring to Figure 3, the assembly of the various discs in the preferred form of the invention will be described. Starting at the lowest filter disc, designated as 33', inlet disc 31 is placed directly overlying disc 33'. In many cases, it is desirable that the discs be stacked by slipping them over a guide tube, against which tabs 37, 46 and 51 as well as elongated fingers 40 will lie. As the discs are stacked the various tabs and elongated fingers should be placed in the same vertical line to align the discs properly. Another filter disc 33 is placed directly over the inlet disc 31. Then on top of the second filter disc, a spacer disc 34 is placed. Drainage disc 32 is placed in a position directly over spacer disc 34. Fingers 39 of the drainage discs in most cases should lie directly over the webs of the spacer discs.

Another spacer disc 34 is placed immediately above drainage disc 32, as shown in the exploded perspective view of Figure 3. Another filter disc is then placed upon the upper spacer disc. This top filter disc is actually the same as filter disc 33' and may be considered as a starting disc for a new series in the stack making up the filter cartridge.

Stacking discs in the series described provides a filter cartridge in which much of the dirty fluid will flow in outwardly opening channels 48 in the inlet disc, then through the filter discs to the channels 41 of the drainage disc, and then to the central bore of the cartridge. This part of the fluid will, of course, be clarified. Another portion of the fluid will enter the channels 53 of the spacer disc between the filter disc and the drainage disc, flow to channels 41 of the drainage disc, and then to the central bore of the cartridge. This latter portion of the fluid has not been clarified. However, this portion of the fluid is strained, and large particles which might injure the engine in a single pass therethrough are removed. By suitable design of the spacer disc, it is possible to control the proportions of clarified and unclarified fluid leaving the filter. For example, the webs 49 of the spacer disc may be made wider, thereby decreasing the opening between drainage discs and filter discs in communication with the filter chamber and reducing the amount of unclarified oil.

Still another means of controlling the proportions of clarified and unclarified fluid is available and has further advantages. The thickness of the spacer disc may be varied which will control the size of the openings between the filter and drainage disc. If the spacer disc is exceedingly thin the opening between the filter disc and the drainage disc will then be long and narrow and the fluid passing through that opening will be strained. Thus, the control of the thickness of the spacer disc will not only control the proportions of clarified and unclarified fluid but can be used to determine the degree of straining of the unclarified fluid. It has been found, for example, that if the spacer discs are 0.020" thick, sufficient compression of the discs will result during assembly to reduce the size of the openings to prevent particles greater than 0.005" in diameter from by-passing the filter material.

While the series of discs, illustrated in Figure 3, is the preferred form of the invention, it is, of course, apparent that some changes in the series may be desirable. For example, in some cases, it might be desirable to have a spacer disc on only one side of the drainage disc. In this case the amount of fluid that was allowed to by-pass the filter disc would be approximately halved. Then again it might be desirable that a spacer disc only lie adjacent every second, or maybe every third, drainage disc. In this manner still further control of the proportion of fluid by-passing the filter disc is gained. This method of control, however, does not provide any control of the degree of straining of the unclarified fluid.

A modification of the invention in which the use of a spacer disc is eliminated, is illustrated in Figure 2 and Figure 4. In this form of the invention, the inlet discs and drainage discs are stacked in alternating relationship to each other. A filter disc is placed between the inlet disc and drainage disc but no spacer discs are placed between the filter discs and drainage discs. Thus the series consists of a filter disc, an inlet disc, a filter disc, a drainage disc and a filter disc stacked in the order named. The last named filter disc may also be considered the starting disc of an adjacent series. Of course, it is is desirable that the discs be aligned properly as was the case in the preferred form.

Filter disc 33 and drainage disc 32 are exactly similar to the corresponding discs used in the preferred form of the invention and need not be described in detail. The inlet disc, however, has an important change in one respect. In this modification the webs 44 of the inlet disc should be more widely spaced than in the preferred form.

Because of the widely spaced webs in the inlet disc, the filter disc is not pressed uniformly against the outer annulus 38 of the drainage disc. As illustrated in a greatly exaggerated manner in Figure 4, the filter disc is thus free to pucker and becomes slightly displaced from the drainage disc. Thus, it is possible for some of the fluid to flow through the space 54 between the filter disc and the drainage disc formed as a result of the puckering. Once this part of the fluid has passed the outer annulus 38 of the drainage disc, it is free to enter the channels 41 of that disc and flow to the cartridge outlet. It is seen that the puckering of the filter disc which results from the wide spacing of the webs of the inlet disc forms passages through which part of the unclarified fluid may by-pass the filter material, thereby providing a filter cartridge in which only part of the fluid is forced to pass through the filtering material. The spacing of the webs will, of course, depend on the rigidity of the material used in the discs.

The amount of fluid by-passing the filter material in this modification of the invention may be varied by the spacing of the webs of the inlet disc. However, because of the irregular shape of the spaces resulting from puckering of the filter discs, the close control of the amount of fluid by-passing the filtering material that was obtained in the preferred form is not possible in this modification of the invention. In addition, the irregular shape of the channel formed by the puckering of the filter disc does not lend itself to efficient control of the straining of the by-passing fluid. On the other hand, this modification does permit a more simple stacking procedure and also the provision of a greater area of filtering surface in a cartridge of a given size.

Filter cartridges of the nature described may be used in a casing to provide a filter through which a high rate of flow may be maintained. These cartridges are especially adaptable for use where it is not desirable to install a separate pump and conduit for circulating a part of an oil stream through the filter. In many cases, it is not necessary that the entire oil stream be filtered in every pass through the lubricating system, and in these cases this invention provides a valuable filtering device.

In the preferred form of the invention a device is disclosed which allows that portion of the fluid by-passing the filtering medium to pass through a strainer. The size of any contaminating substance removed by the strainer can be closely controlled by the use of the unique spacer disc of this invention.

While several embodiments of this invention have been described in detail, one skilled in the art may make many changes in the details without departing from the concept of this invention which is limited only by the appended claims.

We claim:

1. A filter cartridge comprising a series of centrally apertured discs stacked to form a cartridge with a central bore, certain of said discs having webs extending from an annular surrounding the central aperture and serving as inlet discs, other of said discs having fingers extending inwardly to the central aperture from an outer annulus and serving as drainage discs, the edges of adjacent fingers being parallel near their inner ends, other of said discs having webs extending outwardly from an annulus surrounding the central aperture but of less thickness than the inlet discs and serving as spacer discs, the remainder of said discs being of a porous material and constituting filter discs, said inlet and drainage discs being stacked in alternating relationship to each other, spacer discs lying adjacent both sides of said drainage discs, and filter discs lying adjacent both sides of said inlet discs.

2. In a liquid filter including a filter casing having an inlet and outlet, a series of centrally apertured discs stacked to form a tubular filter element with a central bore, certain of said discs being drainage discs having channels therein communicating with the filter outlet, other of said discs being inlet discs having channels communicating with the filter inlet, other of said discs having channels communicating with the filter inlet serving as spacer discs, and still other of said discs being filter discs of a porous material and continuous from their outer edge to their central aperture, said drainage discs being separated from inlet discs in the filter element by filter discs, and the spacer discs in the stacked discs being adjacent the drainage discs whereby the channels in the drainage discs communicate with the channels in the spacer discs to by-pass a portion of the liquid around the filter material.

3. In a liquid filter including a filter casing having an inlet and outlet, a series of centrally apertured discs stacked to form a tubular filter element with a central bore, certain of said discs being drainage discs having channels therein communicating with the filter outlet, other of said discs being inlet discs having channels communicating with the filter inlet, other of said discs having channels communicating with the filter inlet serving as spacer discs, said spacer discs having a thickness not exceeding about 0.020 inch, and still other of said discs being filter discs of a porous material and continuous from their outer edge to their central aperture, said drainage discs being separated from inlet discs in the filter element by filter discs, and the spacer discs in the stacked discs being adjacent the drainage discs whereby the channels in the drainage discs communicate with the channels in the spacer discs to by-pass a portion of the liquid around the filter material.

4. In a liquid filter including a filter casing having an inlet and an outlet, a filter element comprising inlet discs, drainage discs, filter discs and spacer discs stacked to form a tubular filter element, said inlet discs having an inner annulus with webs extending substantially radially therefrom to form channels opening outwardly, said drainage discs having an outer annulus with fingers extending substantially inwardly to form channels opening inwardly, said filter discs being annular members of a porous filter material continuous from the inner to the outer edge of the annulus, said drainage discs and inlet discs positioned alternately in the filter element, said filter discs positioned between the drainage discs and the inlet discs, and said spacer discs positioned adjacent the filter discs on one side and having channels therein communicating with the channels in the adjacent drainage disc opposite the filter disc to permit direct flow of the liquid from the inlet of the casing to the outlet without passing through the filter disc.

5. In a liquid filter including a filter casing having an inlet and an outlet, a filter element comprising inlet discs, drainage discs, filter discs, and spacer discs stacked to form a tubular filter element, said inlet discs having an inner annulus with webs extending substantially radially therefrom to form channels opening outwardly, said drainage discs having an outer annulus with fingers extending substantially inwardly to form channels opening inwardly, said filter discs being annular members of a porous filter material continuous from the inner to the outer edge of the annulus, said drainage discs being separated from inlet discs in the filter element by filter discs, and the spacer discs being positioned adjacent the filter discs in the stacked filter element having channels therein communicating with the channels in the adjacent drainage disc opposite the filter disc to effect by-passing of the filter material by a portion of the liquid passing through the filter.

6. In a filter for liquids including a filter casing having an inlet and an outlet, a filter element comprising inlet discs, drainage discs, filter discs, and spacer discs stacked to form a tubular filter element, said inlet discs having an annulus with webs extending substantially radially therefrom to form channels opening toward the inlet, said drainage discs having an annulus with fingers extending substantially radially therefrom to form channels opening toward the outlet, said filter discs being annular members of a porous filter material continuous from the inner to the outer edge of the annulus, said drainage discs being separated from inlet discs in the filter element by filter discs, and the spacer discs having a reduced thickness relative to the other discs and including a continuous annulus having channels opening therefrom toward the inlet of the filter, said spacer discs being positioned adjacent the drainage discs in the stacked filter element whereby the channels in the spacer discs communicate directly with the channels in the drainage discs to effect by-passing of the filter material by a portion of the liquid passing through the filter.

7. In a filter for liquids including a filter casing having an inlet and an outlet, a filter element comprising inlet discs, drainage discs, filter discs, and spacer discs stacked to form a tubular filter element, said inlet discs having an inner annulus with webs extending substantially radially therefrom to form channels opening outwardly, said drainage discs having an outer annulus with fingers extending substantially inwardly to form channels opening inwardly, said filter discs being annular members of a porous filter material continuous from the inner to the outer edge of the annulus, said drainage discs being separated from inlet discs in the filter element by filter discs, and the spacer discs having a reduced thickness relative to the other discs and including an inner annulus having fingers extending therefrom to define channels opening outwardly, said spacer discs being positioned adjacent the drainage discs in the stacked filter element whereby the channels in the spacer discs communicate directly with the channels in the drainage discs to effect by-passing of the filter discs by a portion of the liquid passing through the filter.

SOUTHWICK W. BRIGGS.
WALTER J. EWBANK.

REFERENCES CITED

The following references are of record in the file of this patent:

UNITED STATES PATENTS

| Number | Name | Date |
| --- | --- | --- |
| 915,650 | Anderson | Mar. 16, 1909 |
| 2,154,565 | Fife | Apr. 18, 1934 |
| 2,359,475 | Gauthier | Oct. 3, 1944 |
| 2,454,033 | Briggs | Nov. 16, 1948 |
| 2,455,486 | Hicks | Dec. 7, 1948 |
| 2,495,095 | Ewbank | Jan. 17, 1950 |